Patented Apr. 12, 1927.

1,623,989

UNITED STATES PATENT OFFICE.

VIKTOR WIKKULA, OF HELSINGFORS, FINLAND.

ICE CONCRETE.

No Drawing. Application filed March 14, 1924, Serial No. 699,388, and in Finland January 21, 1924.

The cement products hitherto known, like concrete and other mineral building materials, have the drawback, that they are bad heat and sound insulators, main'y in consequence of the density of the material; therefor they are disadvantageous in other than supporting parts. In Sweden there has been invented a so-called gas-concrete, which is porous, but which again has the great drawback, that it is not possible to shape it at will until after it has hardened.

After long experimenting I have invented a material and a method, by which concrete or any other hydraulically hardening material can be made more or less porous, and by means of stamping, pressing or moulding immediately be shaped at will. It is even possible to predetermine the bearing strength of the pieces, and likewise the size and quantity of the pores, as well as the quantity and synthesis of the additional materials to be used for the pieces, according to whether they are to be used for exterior walls, partition-walls, ceilings, or other purposes.

Such a porous building material, "ice-concrete", is made by means of mixing snow, crumbled ice or artificial hailstones with some quickly hardening hydraulic material, for instance plaster, which encloses and insu'ates all snow or ice particles used in order to produce pores in the intended mass; at the same time this enclosing material prevents the snow or ice particles from melting too quickly, thus facilitating the stamping or pressing of the mass to pieces of desired shape. Should it be desirable to mould the piece, water is added until the mixture becomes fluid, but not before the snow or ice particles have been enclosed by the hydraulic material, e. g. plaster.

Should it be desirable to use several materials, as for instance cement, &c., there can, after the snow or ice particles have been insulated in the aforesaid way, be put into the mixture cement with its additional materials, or other hardening materials, according to the desirable degree of strength of the intended piece. Thus it is possible to predetermine the size and quantity of the pores of the intended piece, by means of using a greater or smaller quantity of greater or smaller snow or ice particles in proportion to the other parts of the mixture. After all these compositions have been well mixed together, the mass can be stamped, pressed or moulded into pieces of desired shape and size.

After the stamping, pressing or moulding the pieces made are brought into a warm room where the hardening can at once quietly begin, and the snow or ice particles, which are contained in the mass, can begin to melt, giving the mass the humidity, which for instance cement needs for hardening. As the snow or ice partic'es enclosed by a hydraulic material, for instance plaster, melt to water, which is partly absorbed by the mass, and partly evaporates into the air, the mass gets porous in desired degree, because it cannot even in its fresh state shrink, this being prevented by the already hardened insulating layer, which encloses the snow or ice particles, and is formed for instance by plaster, as above described.

I claim:

A method of preparing porous building material, which consists in mixing with particles of ice, a rapidly setting hydraulic substance thereby to form an insulating coating on said particles, and mixing said particles into a hydraulically hardening concrete mass.

In testimony whereof I have signed my name to this specification.

VIKTOR WIKKULA.